US012619028B2

(12) United States Patent　(10) Patent No.:　US 12,619,028 B2
Ruivo Rodrigues et al.　(45) Date of Patent:　May 5, 2026

(54) MULTIFUNCTIONAL SELF-SUSTAINED HOSTING APPARATUS AND RELATED BIDIRECTIONAL OPTICAL SUB ASSEMBLY BASED ON PHOTONIC INTEGRATED CIRCUIT

(71) Applicant: PICADVANCED S.A., Ílhavo (PT)

(72) Inventors: Francisco Manuel Ruivo Rodrigues, Ílhavo (PT); Nuno Ricardo Pereira Bastos, Gafanha da Nazaré (PT); Hugo Daniel Barbosa Neto, Gafanha da Nazaré (PT); Yahya Sheikhnejad, Aveiro (PT); Pedro Nuno Lopes Silva, Macieira da Lixa (PT); António Luís Jesus Teixeira, Ílhavo (PT)

(73) Assignee: PICADVANCED S.A., Ílhavo (PT)

( * ) Notice: Subject to any disclaimer, the term of this patent is extended or adjusted under 35 U.S.C. 154(b) by 274 days.

(21) Appl. No.: 18/565,979

(22) PCT Filed: May 25, 2022

(86) PCT No.: PCT/IB2022/054917
§ 371 (c)(1),
(2) Date: Nov. 30, 2023

(87) PCT Pub. No.: WO2022/254290
PCT Pub. Date: Dec. 8, 2022

(65) Prior Publication Data
US 2024/0272383 A1　Aug. 15, 2024

(30) Foreign Application Priority Data

May 31, 2021　(PT) ......................................... 117262

(51) Int. Cl.
*G02B 6/12*　(2006.01)
*G02B 6/36*　(2006.01)
*G02B 6/42*　(2006.01)

(52) U.S. Cl.
CPC ....... *G02B 6/12004* (2013.01); *G02B 6/3652* (2013.01); *G02B 6/4243* (2013.01);
(Continued)

(58) Field of Classification Search
CPC .. G02B 6/12002; G02B 6/12004; G02B 6/30; G02B 6/3648; G02B 6/3652; G02B 6/4243; G02B 6/4279
See application file for complete search history.

(56) References Cited

U.S. PATENT DOCUMENTS 5,026,138 A　6/1991　Boudreau et al.
5,138,436 A　*　8/1992　Koepf ..................... H01L 23/66
257/723

(Continued)

FOREIGN PATENT DOCUMENTS

JP　2000-77778 A　*　3/2000
WO　2020077285 A1　4/2020

OTHER PUBLICATIONS

Mireles et al: "Optical fiber packaging for MEMS interfacing", Proc. SPIE 7204, Micromachining and Microfabrication Process Technology XIV, 720405 (Feb. 23, 2009); https://doi.org/10.1117/12.815170.

(Continued)

*Primary Examiner* — Michael Stahl
(74) *Attorney, Agent, or Firm* — The Roy Gross Law Firm, LLC; Roy D. Gross

(57)　ABSTRACT

The invention refers to a multifunctional self-sustained hosting apparatus for photonic integrated circuit and/or related chipset system packaging comprising a processed
(Continued)

wafer (1); and at least a cavity (2), wherein said cavity (2) is configured to receive a chipset or an optical lens; and at least a V-groove (3), which is configured for receiving at least an in/out optical fiber and optically align said optical fiber with an optical endface of a chipset. The invention also refers to a bidirectional optical sub assembly based on photonic integrated circuit, which comprises said hosting apparatus.

The hosting apparatus enables PIC&IC co-packaging allowing to answer current and future requirements in diverse PIC applications. The apparatus provides electrical interconnections using direct-current lines and radio frequency lines, and may host a plurality of chipsets with different dimensions and orientations, providing a high-precision optical coupling between arrays of optical fibers and optical endface of chipsets.

23 Claims, 7 Drawing Sheets

(52) U.S. Cl.
 CPC ......... *G02B 6/4246* (2013.01); *G02B 6/4249* (2013.01); *G02B 6/4267* (2013.01); *G02B 6/4279* (2013.01)

(56) References Cited

U.S. PATENT DOCUMENTS

| | | | |
|---|---|---|---|
| 5,412,748 A * | 5/1995 | Furuyama ............ | G02B 6/4249 385/88 |
| 5,611,008 A * | 3/1997 | Yap ....................... | G02B 6/4232 398/1 |
| 5,621,837 A * | 4/1997 | Yamada ............... | G02B 6/4232 385/88 |
| 6,502,999 B1 | 1/2003 | Cohen et al. | |
| 6,888,989 B1 | 5/2005 | Zhou et al. | |
| 7,031,576 B2 | 4/2006 | Deane | |
| 10,438,894 B1 | 10/2019 | Farooq et al. | |
| 2001/0010744 A1* | 8/2001 | Shuto ................... | G02B 6/4274 385/92 |
| 2001/0017964 A1* | 8/2001 | Setoguchi ............ | G02B 6/4253 385/88 |
| 2003/0137022 A1 | 7/2003 | Dautartas et al. | |
| 2005/0018969 A1 | 1/2005 | Deane | |
| 2018/0136401 A1 | 5/2018 | Pezeshki et al. | |
| 2019/0285813 A1 | 9/2019 | Patel et al. | |

OTHER PUBLICATIONS

PCT International Search Report for International Application No. PCT/IB2022/054917, mailed Aug. 3, 2022, 4pp.
PCT Written Opinion for International Application No. PCT/IB2022/054917, mailed Aug. 3, 2022, 6pp.

* cited by examiner

[Fig. 1]
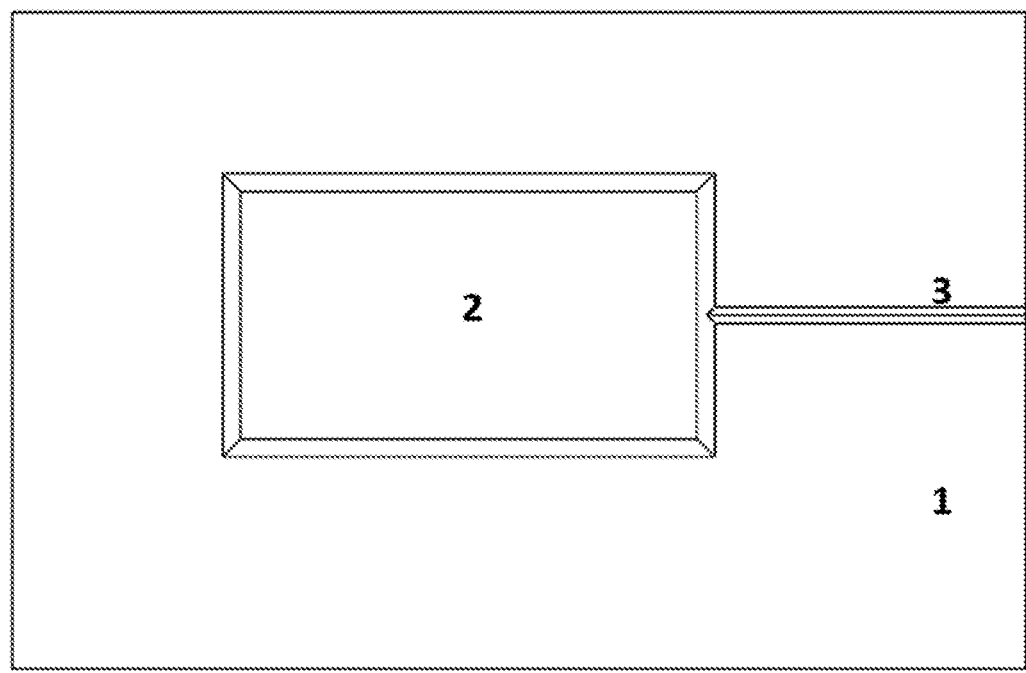
[Fig. 2]
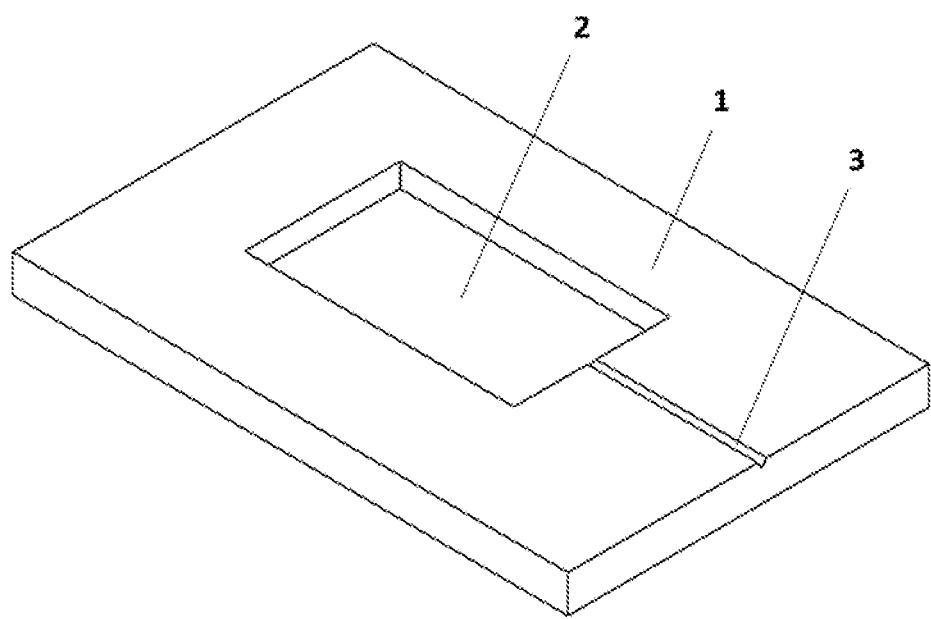

[Fig. 3]
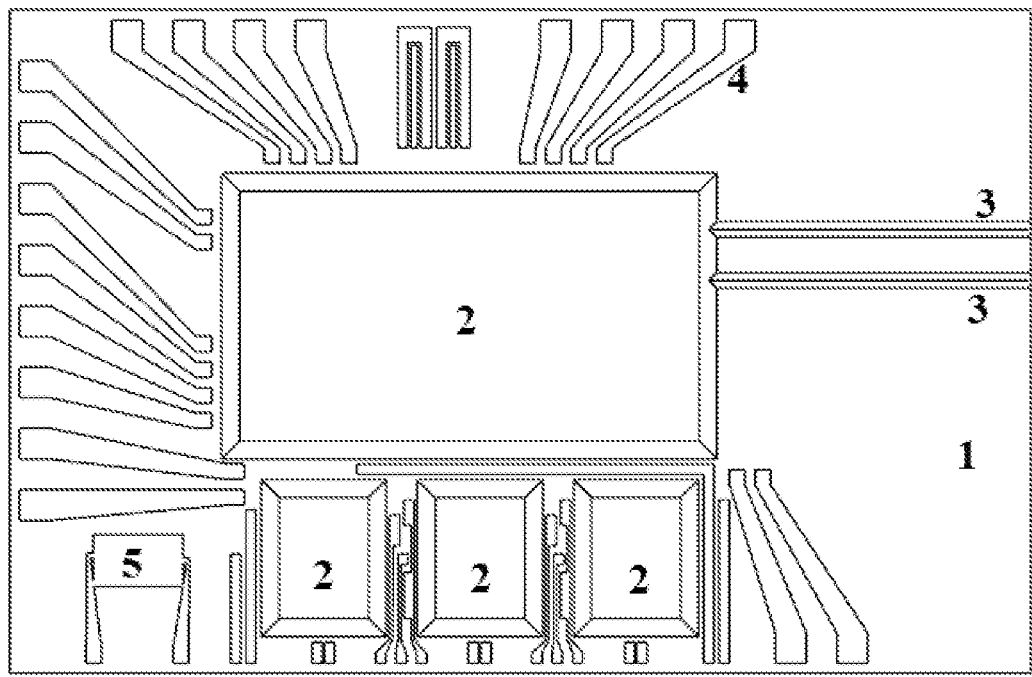
[Fig. 4]
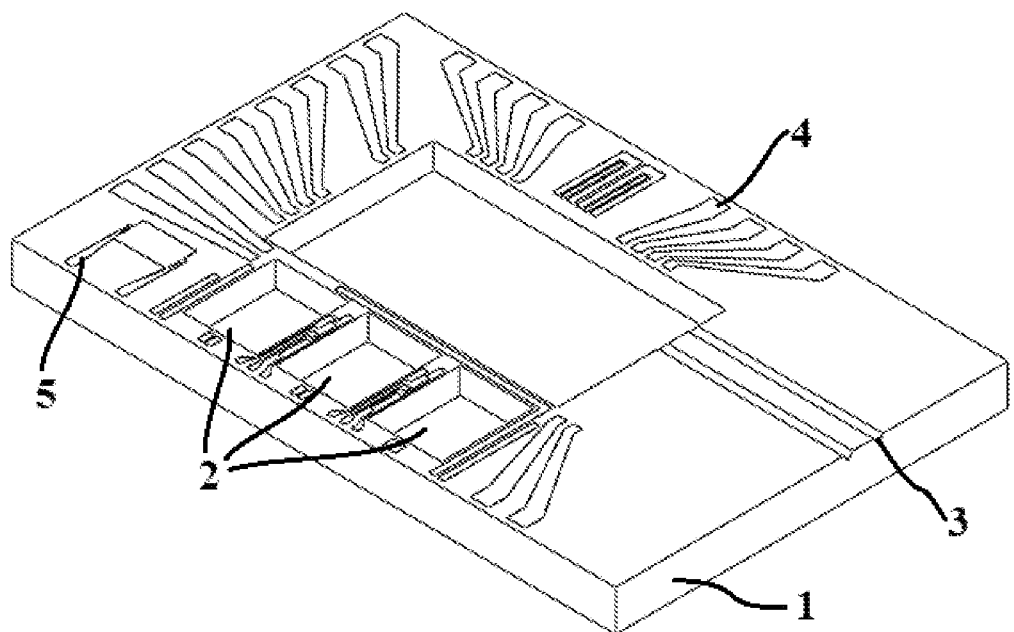

[Fig. 5]
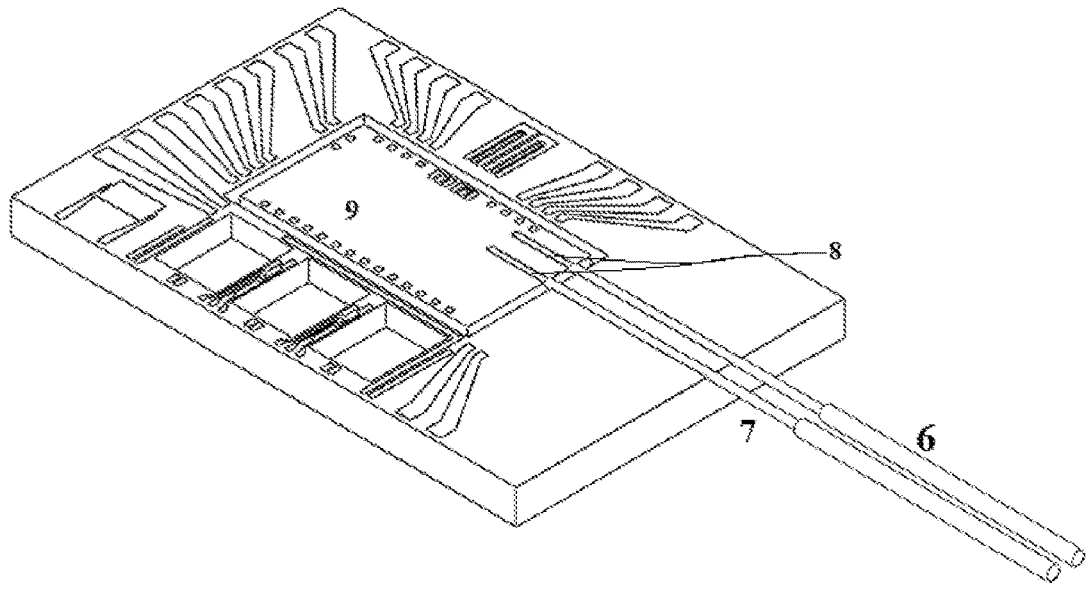
[Fig. 6]
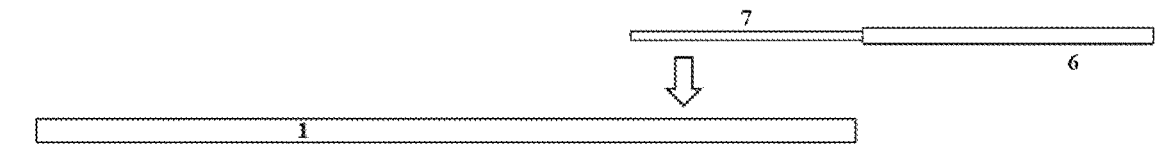
[Fig. 7]
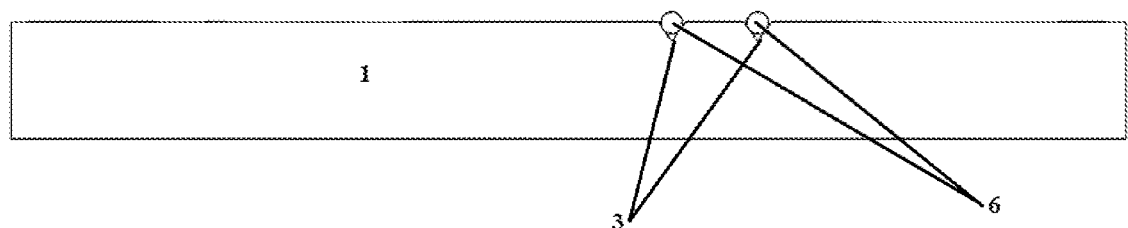
[Fig. 8]
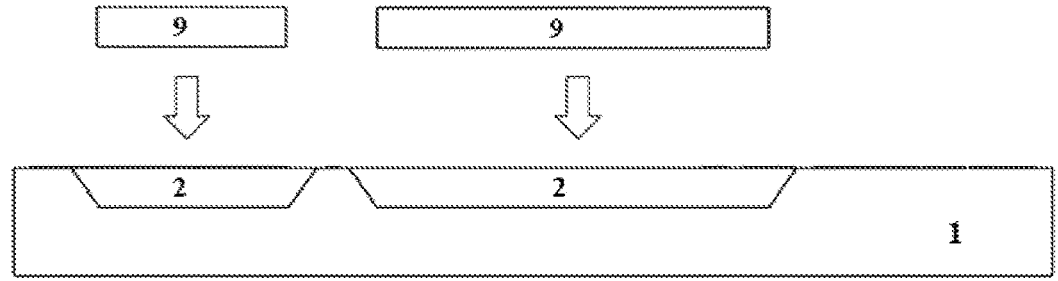

[Fig. 9]
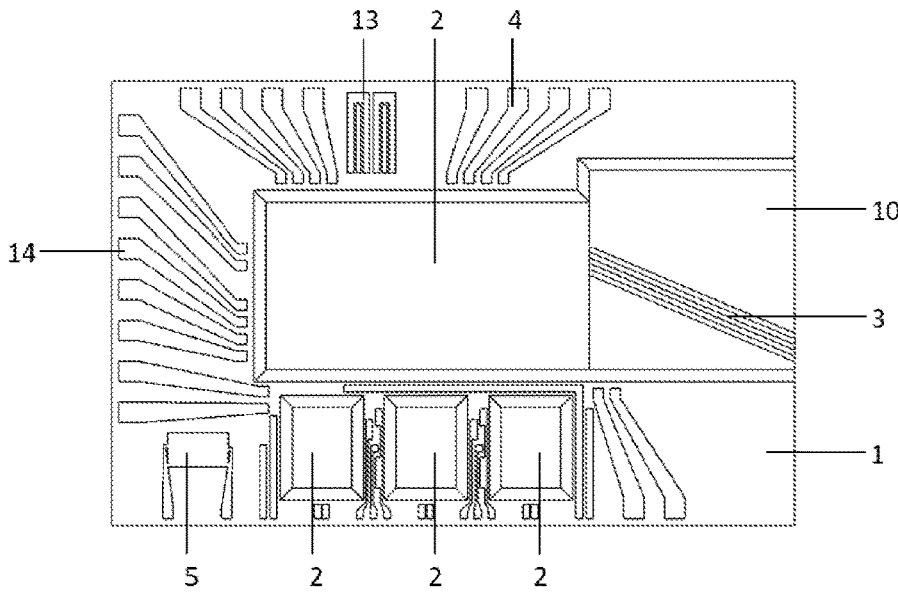
[Fig. 10]
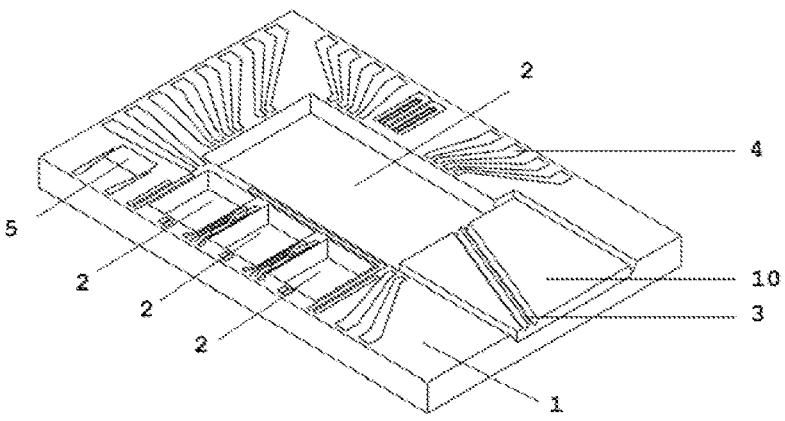
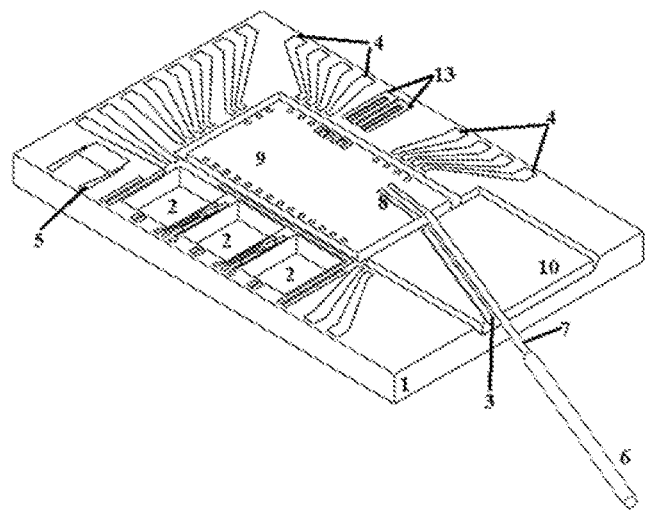

[Fig. 11]
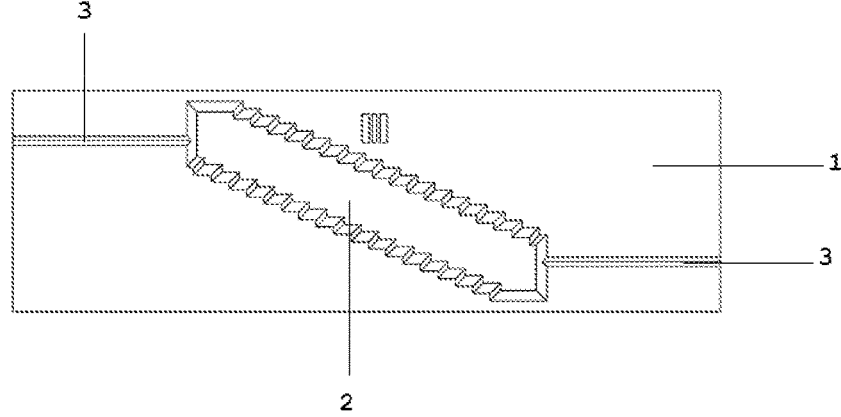
[Fig. 12]
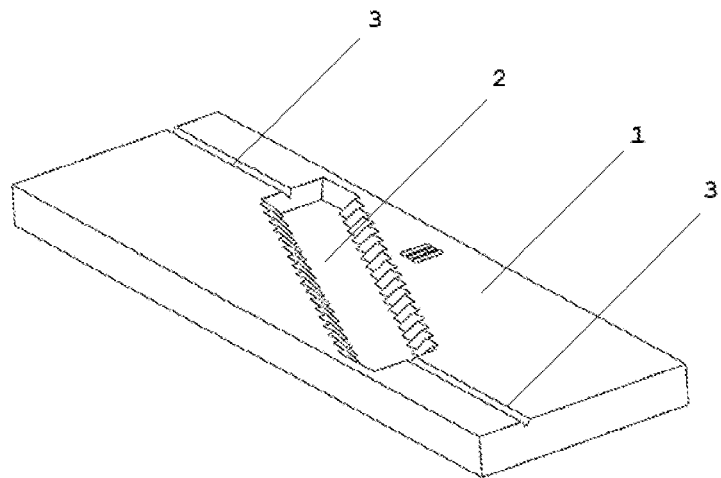
[Fig. 13]
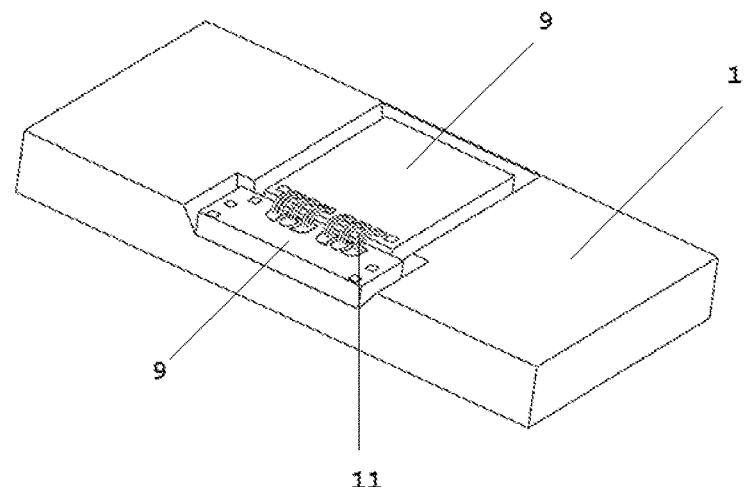

[Fig. 14]
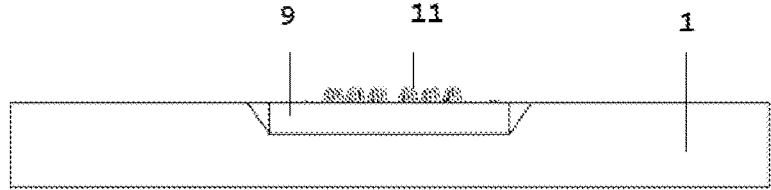
[Fig. 15]
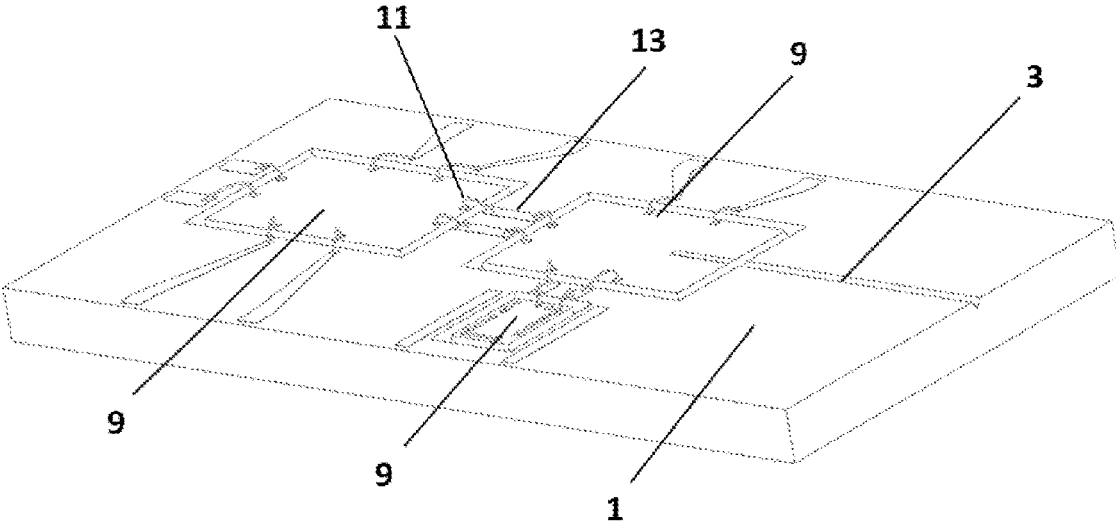
[Fig. 16]
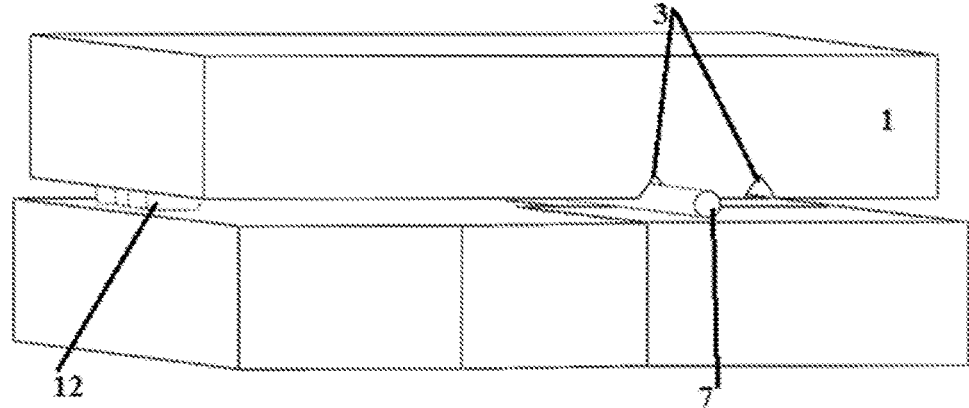

[Fig. 17]
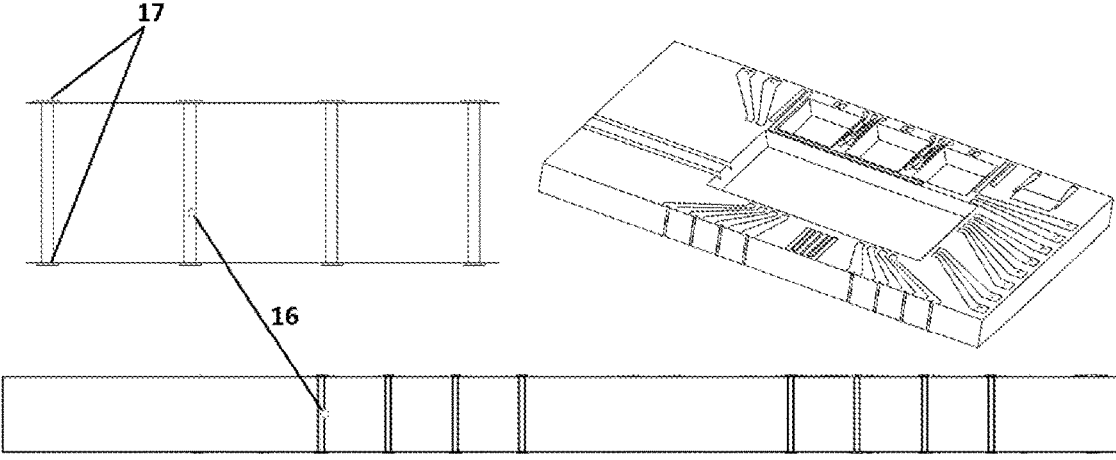
[Fig. 18]
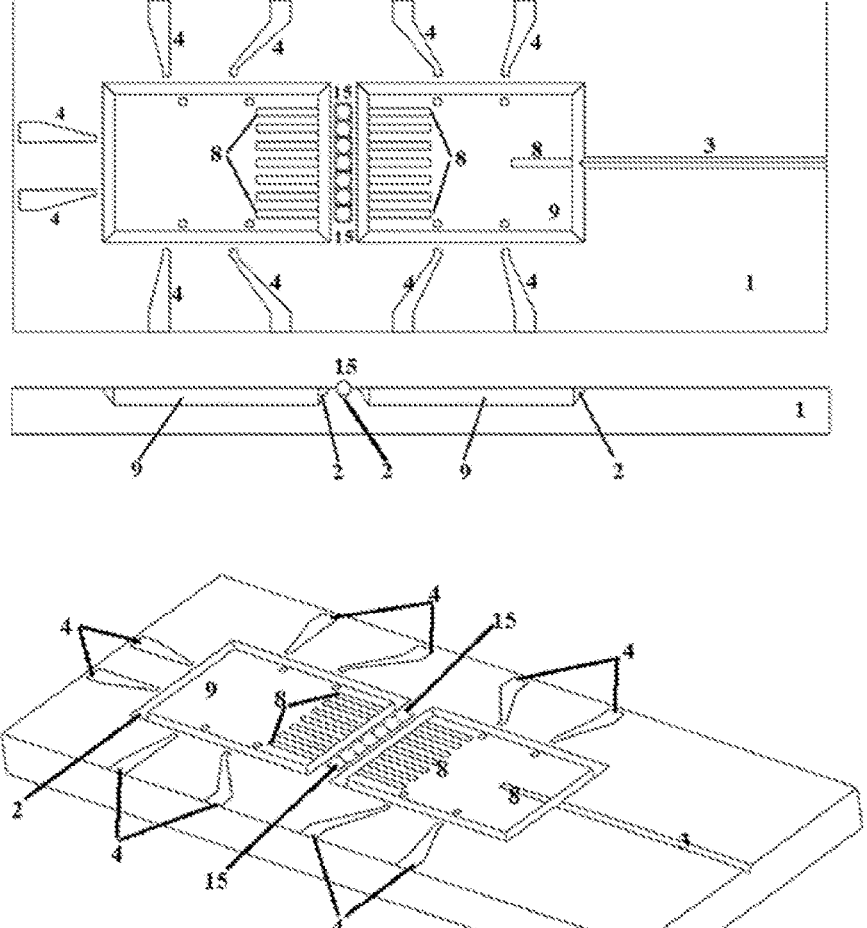

MULTIFUNCTIONAL SELF-SUSTAINED HOSTING APPARATUS AND RELATED BIDIRECTIONAL OPTICAL SUB ASSEMBLY BASED ON PHOTONIC INTEGRATED CIRCUIT

CROSS REFERENCE TO RELATED APPLICATIONS

This application is a National Phase of PCT Patent Application No. PCT/IB2022/054917 having International filing date of May 25, 2022, which claims the benefit of priority of Portugal Patent Application No. 117262, filed May 31, 2021, the contents of which are all incorporated herein by reference in their entirety.

TECHNICAL FIELD

The present invention refers to a multifunctional self-sustained hosting apparatus configured for photonic integrated circuit and/or related chipset system packaging as well as applications that involve emitting and/or collecting light for pre-processing or post-processing and a related bidirectional optical sub assembly (BOSA) based on photonic integrated circuit (PIC). The applications of said hosting apparatus comprise photonic integrated circuits (PICs) and integrated circuits (IC) co-packaging, hosting of arbitrary oriented multiple chipsets and optically aligning of arbitrary-oriented multiple optical fibers, either through direct coupling or through lenses alignment taking advantage of the cavities in the apparatus. The present invention also refers to a BOSA based on PIC comprising said hosting apparatus, wherein the hosting apparatus is configured to provide a high-precision PIC&IC co-packaging, including but not limited to the optical alignment of an optical fiber array with optoelectronic devices by means of V-groove microstructures, while covering thermo-electrical management and electrical interconnections. Therefore, the present invention refers to a host platform for integrated circuit packaging providing functionalities of bidirectional optical alignment, electrical interconnection and thermal management.

BACKGROUND ART

Recently, industrial trends strongly favor the concepts of high density, low-power consumption and low-cost applications of Datacom and Telecom pluggable transceiver modules. Hence, there are various challenges in the design of high-performance compact optical transceivers. In a continuous competition for higher data bitrate, the next generation of passive optical network has been imposing higher standards on the optical transceivers. Moreover, the growing trend of multichannel optical devices (e.g., wavelength division multiplexing network) demands for accurate low-loss high-resilient electro-optical packaging. This fact implied the profitability of the proposed solution to the wide telecommunication market.

Therefore, a higher level of integration and miniaturization (HLI&M) in PIC and associated packaging are essential in order to develop devices that meet the current standards and demands. This problem is already considered as the most significant bottleneck in the development of commercially relevant integrated photonic devices. Overcoming this problem will be a golden key to considerably reduce the necessary amount of materials to produce said integrated photonic devices and the related production costs. In this context, a higher level of integration with the capability of handling an array of optical fibers demands less usage of active components, gather all required functionalities and simultaneously merge and unify these functionalities into a single small device. The optical fibers are an essential part of photonic devices and have to be strictly managed, because a few microns deviation could lead to a significant optical power loss. In order to comply with HLI&M and at the same time achieve this goal, optical fibers must be passively aligned with optoelectronic devices. This part of the problem is addressed by some prior art documents.

For example, the most common geometry for passive alignment of an optical fiber is a V-groove on a substrate as disclosed in the U.S. Patent No. U.S. Pat. No. 7,031,576B2 of National Semiconductor Corp., entitled "CONNECTOR-IZED SILICON BENCH FOR PASSIVELY ALIGNING OPTICAL FIBERS" and published on Apr. 18, 2006, and U.S. Patent No. US6888989B1 of "Phosistor Technologies Inc., entitled "FIBER ARRAY WITH V-GROOVE CHIP AND MOUNT" and published on May 3, 2005. The former which is incorporated by reference herein, discusses the connectorized silicon bench with a groove formed in the bench to accommodate an optical fiber and together with a ferrule including a recess region will assist passive alignment. The latter, however, the molded mount of non-crystalline polymer material was configured to have a channel for aligning one silicon chip having a few number of V-grooves. The optical fibers were securely sandwiched by two such molded mounts with silicon chips opposing one another to align optical fibers in between.

The U.S. patent application No. US20190285813A1 of Cisco Tech Inc., entitled "FIBER TO CHIP ALIGNMENT USING PASSIVE VGROOVE STRUCTURES" and published on Sep. 19, 2019, which is hereby incorporated herein by reference in its entirety, endeavors to address the above challenge by providing a substrate comprising a plurality of waveguides arranged at a predefined depth as well as plurality of optical fibers and a lid member with grooves formed therein.

The passive alignment of an optical fiber by employing an optical coupler array is addressed also in a very recent International Patent Application No. WO2020077285A1 of Chiral Photonics Inc., entitled "PASSIVE ALIGNING OPTICAL COUPLER ARRAY" and published on Apr. 16, 2020, in which an elongated optical element having a coupler housing structure and at least one longitudinal waveguide embedded in said mentioned housing structure for coupling, e.g., a plurality of optical fibers to at least one optical device. According to this prior art document, said apparatus can be used for passive coupling light to and from a plurality of multicore multimode fibers to a PIC device.

Despite of the very recent advances in this technical field, the prior art is quite limited in revealing solutions referred to multifunctional and flexible processed wafers, which would be configured to overcome problems inherent to high-throughput dense PIC packaging problems.

Therefore, there exists a great interest and need to develop an apparatus that allows miscellaneous optoelectrical connections with multiple chipsets, keeping flexibility according to the orientation, shape and dimensions (both horizontally and vertically) of said chipsets, in order to be employed in wide applications, particularly photonic integrated circuits (PICs).

Driven by the needs to increase device functionality and speed, the electrical coupling plays one of the major challenges on PIC packaging, as the IC devices must be as close as possible to the PIC active components, in order to maximize signal integrity and high-frequency performance. An apparatus that provides the electrical routing flexibility, from direct-current (DC) to radio frequency (RF) domains between the IC devices and PICs, in one single host will play a key role on reducing the chip footprints and the electrical connections pitch without harm the high frequency performance.

In addition, in contrary to the IC area, in PIC packaging there is a serious challenge on thermal management. Keeping the temperature of PIC precisely at a certain value is essential especially in tight wavelength dependent system. The presented invention may be also featured by a thermistor that takes part in thermal management and play an important role in PIC packaging.

SUMMARY OF INVENTION

In a first aspect, the present invention refers to a multifunctional self-sustained hosting apparatus for photonic integrated circuit and/or related chipset system packaging comprising:

a processed wafer (1); and
 at least a cavity (2) embedded on a top surface of the processed wafer (1), wherein the cavity (2) is configured to receive at least one from the group consisting of a chipset (9) and an optical lens (15); and
 at least a V-groove (3), which is formed on the top surface of the processed wafer (1) or in a submount (10); and
 wherein the submount (10) is attached to a recess in the processed wafer (1); and
 wherein said V-groove extends from an edge of said processed wafer (1) or said submount (10) toward the cavity (2); and
 wherein said V-groove (3) is configured for receiving at least an in/out optical fiber (7) and optically align said in/out optical fiber (7) with an optical endface of a chipset (8).

The present invention, in a second aspect, refers to a bidirectional optical sub assembly based on photonic integrated circuit comprising a multifunctional self-sustained hosting apparatus for photonic integrated circuit and/or related chipset system packaging, wherein said hosting apparatus comprises:

a processed wafer (1); and
 at least a cavity (2) embedded on a top surface of the processed wafer (1), wherein the cavity (2) is configured to receive at least one from the group consisting of a chipset (9) and an optical lens (15); and
 at least a V-groove (3), which is formed on the top surface of the processed wafer (1) or in a submount (10); and
 wherein the submount (10) is attached to a recess in the processed wafer (1); and
 wherein said V-groove extends from an edge of said processed wafer (1) or said submount (10) toward the cavity (2); and
 wherein said V-groove (3) is configured for receiving at least an in/out optical fiber (7) and optically align said in/out optical fiber (7) with an optical endface of a chipset (8); and
 the bidirectional optical sub assembly based on photonic integrated circuit further comprises at least one from the group consisting of a chipset (9) and an optical lens (15) fixed on the cavity (2) of said hosting apparatus; and the bidirectional optical sub assembly based on photonic integrated circuit further comprises at least an in/out optical fiber (7) connected to the V-groove (3) of said hosting apparatus; and
 the bidirectional optical sub assembly based on photonic integrated circuit further comprises an optical endface of a chipset (8) optically connected to an end part of the in/out optical fiber (7) by means of an edge coupling.

The present invention, in a third aspect, refers to a use of a multifunctional self-sustained hosting, according to the first aspect of the invention, in at least one application selected from the group consisting of photonic integrated circuits and integrated circuits co-packaging, hosting of arbitrary-oriented multiple chipsets and optically aligning of arbitrary-oriented multiple optical fibers.

Technical Problem

The prior arts have designated different components separately to perform the respective assigned tasks, which are also known as discrete components, and hence there is no need for such a component like the hosting apparatus according to the present invention. On the other hand, in the integrated component strategy, the hosting apparatus is required not only for hosting different functionalities, but also for conferring orientation flexibility to embedded chipsets as well as optical fibers. The shape, dimensions and orientation of chipsets and optical fibers depend on their functionalities and applications but, must work coherently together through proper contact type.

Regarding the desired solutions to technical drawbacks observed in the prior art, through using the hosting apparatus according to the invention, it is possible to host all the chipsets and functionalities that need to be close to PIC for alignment and management purposes and use this "single processed wafer" approach to integrate them into a printed circuit board (PCB) or any other system (main system carrier) in an easy manner. On the other hand, in the integrated component strategy, which depends on the degree of integration, PIC may call for a multifunction platform. Therefore, for some applications, the prior art solutions are unsuitable, and the hosting apparatus of the present invention may overcome these limitations.

In addition, in the case of monolithic implementation, it is natural to have no need for multiple cavities. But as the standards of networks and transceivers are updated and upgraded, the need for dense integrity and embedding several functionalities within less space will appear. Moreover, there is a possibility that some new scientific findings and/or physical laws ask for different chipset's orientations or different optical fiber's orientations.

Under these circumstances, to satisfy all current and future requirements, the hosting apparatus is presented not only for hosting different functionalities but also for conferring orientation flexibility to retain multiple chipsets as well as optical fibers. The shape, dimensions and orientation of chipsets depend on their functionalities and applications but, must work coherently together through proper contact type.

Solution to Problem

The present invention solves the problems of prior art by integrating different functionalities in the very same hosting apparatus for photonic integrated circuits and/or related chipset system, either through direct coupling or through lenses alignment taking advantage of the cavities in the apparatus, and providing connections to a plurality of chipsets. Therefore, the hosting apparatus is not only responsible for aligning optical fibers, but it is also responsible for optical alignment of optical endface of chipsets on two adjacent chipsets via optical lenses. This new hosting apparatus unifies all previously separated components and integrate them such that separate entities and functionalities now work within a miniaturized single entity such that the whole set can be treated as a single entity and ease the packaging into component level. This can be considered as a revolutionary material-functional optimization, and one of important pillars of the present invention.

Other approach and solution used in the present invention is the use of an angled V-groove configuration, based on the fact that a specific angle between an optical fiber and an optoelectronic device could minimize the optical coupling loss by minimizing reflection and optimizing alignment. The common configuration in the prior art is the one in which optical fibers and optoelectronic devices are laid in a straight line.

Advantageous Effects of Invention

The essence of the novel apparatus is an enabler of PIC&IC co-packaging that fundamentally serves as a multifunction platform for integrating several independent components in order to work together coherently. In the context of the present invention, co-packaging is the implementation of different constituent elements from different manufacturing processes within a common enclosure or mounted on a common substrate. Effectively, this is package-level integration.

The multifunctional self-sustained hosting apparatus configured for photonic integrated circuit and/or related chipset system packaging as well as applications that involve emitting and/or collecting light for pre-processing or post-processing according to the present invention is able to host several chipsets, resulting in an outstanding integration through any type of optoelectrical connection. The hosting apparatus of the present invention may be fabricated by means of submicron precision methods, meeting the demanding standards regarding ultra-high compactness in photonic integrated circuits area.

The hosting apparatus of the present invention comprises a multifunction self-sustained layered processed wafer, with a tailored design topology, which acts as a resilient optical coupler platform to manage multiple chipsets with flexibility in their orientation, shape and dimensions (both horizontally and vertically) to be employed in wide applications particularly photonic integrated circuits (PICs).

Moreover, in the preferred embodiments, the hosting apparatus of the present invention comprises a temperature sensor, which is configured to provide thermal management for optoelectrical devices. Therefore, the present invention will provide to the downstream circuit designer companies a flexible solution, which is configured to provide flexibility in connection type between several chipsets, namely flip-chip technology and wire-bonding. In addition, there is no trace of passive alignment of single/multiple optic fibers with arbitrary angular orientation.

The present invention is responsible for the optical alignment of several chipsets with optical fibers by means of an edge coupling or through lenses in the designed cavities. The present invention introduces a new paradigm, providing a robust remedy for high-throughput dense PIC packaging problems.

The angled V-groove configuration is a part of novel design of the said apparatus based on the well-known state-of-the-art findings that stated specific angle between an optical fiber and an optoelectronic device could minimize optical reflection and optimize alignment.

BRIEF DESCRIPTION OF DRAWINGS

With the purpose of promoting an understanding of the principles in accordance with the embodiments of the present invention, reference will be made to the embodiments illustrated in the figures and to the language used to describe the same. Anyway, it must be understood that there is no intention of limiting the scope of the present invention to the contents of the figures. Any alterations or later changes of the inventive features illustrated herein and any additional application of the principles and embodiments of the invention shown, which would occur normally for one skilled in the art when reading this description, are considered as being within the scope of the claimed invention.

FIG. 1 illustrates an exemplary top view of the simplest hosting apparatus according to the invention;

FIG. 2 illustrates an exemplary perspective view of the simplest hosting apparatus according to the invention;

FIG. 3 illustrates an exemplary top view of the hosting apparatus according to the invention;

FIG. 4 illustrates an exemplary perspective view of the hosting apparatus according to the invention;

FIG. 5 illustrates an exemplary perspective view of a bidirectional optical sub assembly based on photonic integrated circuit including optical fibers;

FIG. 6 illustrates an exemplary longitudinal side view of a connection between a bidirectional optical sub assembly based on photonic integrated circuit including optical fibers;

FIG. 7 illustrates an exemplary transversal side view of a connection between a bidirectional optical sub assembly based on photonic integrated circuit including optical fibers;

FIG. 8 illustrates an exemplary longitudinal side view of a connection between chipsets and cavities comprised in the hosting apparatus according to the invention;

FIG. 9 illustrates an exemplary top view of a second embodiment of a hosting apparatus according to the invention;

FIG. 10 illustrates an exemplary perspective view of a second embodiment of a hosting apparatus according to the invention;

FIG. 11 illustrates an exemplary top view of a third embodiment of a hosting apparatus according to the invention;

FIG. 12 illustrates an exemplary perspective view of a third embodiment of a hosting apparatus according to the invention;

FIG. 13 illustrates an exemplary perspective view of a connection between two chipsets;

FIG. 14 illustrates an exemplary transversal side view of a connection between two chipsets;

FIG. 15 illustrates an exemplary perspective view of an electrical connection between two chipsets and a host electrical routing;

FIG. 16 illustrates an exemplary use of a technology of flip-chip for the connection of two chipsets comprised in a bidirectional optical sub assembly based on photonic integrated circuit;

FIG. 17 illustrates a "Through Silicon Vias" feature used to electrically connect different conductive layers comprised on a processed wafer; and FIG. 18 illustrates the possibility of using optical lenses associated with the cavities for optical coupling between two chipsets.

DESCRIPTION OF EMBODIMENTS

The present invention, as illustrated in FIGS. 1 and 2, refers to a multifunctional self-sustained hosting apparatus for photonic integrated circuit and/or related chipset system packaging comprising:

a processed wafer (1); and at least a cavity (2) embedded on a top surface of the processed wafer (1), wherein the cavity (2) is configured to receive at least one from the group consisting of a chipset (9) and an optical lens (15); and at least a V-groove (3), which is formed on the top surface of the processed wafer (1) or in a submount (10); and wherein the submount (10) is attached to a recess in the processed wafer (1); and wherein said V-groove extends from an edge of said processed wafer (1) or said submount (10) toward the cavity (2); and wherein said V-groove (3) is configured for receiving at least an in/out optical fiber (7) and optically align said in/out optical fiber (7) with an optical endface of a chipset (8).

The present invention, in a second aspect, refers to a bidirectional optical sub assembly based on photonic integrated circuit comprising a multifunctional self-sustained hosting apparatus for photonic integrated circuit and/or related chipset system packaging, wherein said hosting apparatus comprises:

a processed wafer (1); and at least a cavity (2) embedded on a top surface of the processed wafer (1), wherein the cavity (2) is configured to receive at least one from the group consisting of a chipset (9) and an optical lens (15); and at least a V-groove (3), which is formed on the top surface of the processed wafer (1) or in a submount (10); and wherein the submount (10) is attached to a recess in the processed wafer (1); and wherein said V-groove extends from an edge of said processed wafer (1) or said submount (10) toward the cavity (2); and wherein said V-groove (3) is configured for receiving at least an in/out optical fiber (7) and optically align said in/out optical fiber (7) with an optical endface of a chipset (8); and the bidirectional optical sub assembly based on photonic integrated circuit further comprises at least one from the group consisting of a chipset (9) and an optical lens (15) fixed on the cavity (2) of said hosting apparatus; and the bidirectional optical sub assembly based on photonic integrated circuit further comprises at least an in/out optical fiber (7) connected to the V-groove (3) of said hosting apparatus; and the bidirectional optical sub assembly based on photonic integrated circuit further comprises an optical endface of a chipset (8) optically connected to an end part of the in/out optical fiber (7) by means of an edge coupling.

The processed wafer (1) comprises at least a built-in cavity (2) and at least a V-groove (3), as it is illustrated in FIGS. 1 and 2, as well as comprises in the preferred embodiments multiple cavities (2) and may further comprise built-in multiple V-grooves (3), as it is illustrated in FIGS. 3, 4, 9 and 10. In the preferred embodiments, each cavity (2)

is configured to receive at least one from the group consisting of a chipset (9) and an optical lens (15), and the cavities (2) are disposed in an arbitrary orientation across the processed wafer (1).

The processed wafer (1) is the main part hosting all elements of the hosting apparatus. It is a self-sustained layered wafer, which allows a tailored topology and wide applications particularly but not limited to PIC applications. The processed wafer (1) acts as an integrating host for different chipsets (9) such that all components work together coherently and in a harmony. In the preferred embodiments, a chipset (9) is selected from a group comprising a PIC device, a Transimpedance amplifier (TIA), an Application Specific Integrated Circuit (ASIC), a Laser Driver, a photodiode, among others devices, as it is illustrated in FIGS. 10 and 18.

The processed wafer (1) may comprise several layers, such as an electrical layer to provide electrical connections among chipsets (9) for either a DC line (4) or a RF line (13). In the preferred embodiments, the multifunctional and self-sustained hosting apparatus comprises at least one of the group consisting of a DC line (4) or a RF line (13) embedded on the processed wafer (1). A person skilled in the art would know that from one application to another one, the number of layers, their configurations and their dimensions will be differed. In the preferred embodiments according to the present invention, the top conductive layer is deployed for DC and RF connection. In the preferred embodiments according to the present invention, the main layer is made of silicon, ceramics or polymers, as it would be understood by a person skilled in the art, which allows scalability in mass production and microfabrication.

V-grooves (3) are built-in technical features of the hosting apparatus. There is enough flexibility on several parameters of V-grooves (3), namely their size, dimension, and position, as they are designed based on the layout of a chipset (9) and their physical characteristics. V-grooves may be created on the processed wafer directly via a microfabrication process, or indirectly. In the indirect approach, V-grooves (3) are created on a separate submount (10) and this submount (10) is placed in a designated recess area on the processed wafer (1). V-grooves (3) optically align optical fibers of any kind with optical endfaces of chipsets (8) on said apparatus.

Cavities (2) are a built-in technical feature of the hosting apparatus, as well as providing connections to a plurality of chipsets and their dimensions are based on dimensions referred to a guest chipset (9). Cavities (2) are disposed on the processed wafer (1) at designated positions, which are responsible for receiving the different chipsets (9) and fixing them in proper locations in a bidirectional optical sub assembly based on photonic integrated circuit, which is connectable to external optical fibers. Moreover, the different chipsets (9) may be aligned back to back (b2b) to each other, and optically coupled by one or more optical lenses (15), for instance optical ball lenses, as shown in FIG. 18. The hosting apparatus retains these optical lenses (15) and exploit them for optical coupling between two chipsets (9). In the preferred embodiments according to the invention, an optical lens (15) optically aligns at least one from the group consisting of a pair of optical endface of chipsets (8), which are disposed respectively on adjacent chipsets (9), and a pair of an optical endface of a chipset (8) and an in/out optical fiber (7). As it is illustrated in FIG. 18, at least a pair of optical endface of chipsets (8), which are disposed respectively on adjacent chipsets (9), are optically aligned by at least an optical lens (15), wherein said optical lens (15) is placed in a cavity (2), which is configured to receive said optical lens (15). In another embodiment, not shown in the figures, an optical lens (15) may be placed directly on the top surface of the processed wafer (1), in order to perform the optical alignment of optical endface of chipsets (8) on two adjacent chipsets (9) and/or perform the optical alignment of a pair of an optical endface of a chipset (8) and an in/out optical fiber (7). Therefore, the hosting apparatus is not only responsible for aligning optical fibers, but it is also responsible for optical alignment of optical endface of chipsets (8) on two adjacent chipsets (9) via optical lenses (15) or aligning an optical endface of a chipset (8) with an in/out optical fiber (7).

In the preferred embodiments of the invention, the multifunctional and self-sustained hosting apparatus comprises a plurality of cavities (2) embedded on the top surface of the processed wafer (1), wherein each cavity (2) is configured to receive a chipset (9).

In the preferred embodiments of the present invention, namely in the hosting apparatus and in the bidirectional optical sub assembly based on photonic integrated circuit comprising said hosting apparatus, the cavities (2) are disposed longitudinally or horizontally across the processed wafer (1), forming at least a row of cavities (2), as it is illustrated in FIGS. 3, 4 and 5. In other embodiments according to the present invention, a plurality of cavities (2) are disposed transversely or vertically across the processed wafer (1), forming at least a column of cavities (2). Alternatively, an array or matrix of cavities (2) may be disposed in the processed wafer (1), forming columns and rows of cavities (2), wherein an array or matrix is defined in the context of the present invention as at least a cavity (2) disposed longitudinally across the processed wafer (1) and at least a cavity (2) disposed transversely across the processed wafer (1), even if the dimensions of the cavities (2) are not the same, as illustrated in FIGS. 3, 4 and 5. The cavities (2) may me designed for receiving chipsets (9) or optical lenses (15) having different shapes and dimensions in respect to each other, except obviously not an overlapping condition between chipsets (9).

In other embodiments according to the present invention, the cavities (2) are disposed in a row at an acute angle in relation to the extension of a V-groove (3), as illustrated in FIGS. 11 and 12. This embodiment provides an arbitrary set of oriented cavities (2) that confers embedded chipsets (9) the flexibility of in-plane angular orientation. This embodiment provides several advantages, for example: makes a single platform of optical and electrical coupling and thermal management; devices such as transimpedance amplifiers (TIA), which, must be close to PIC due to bandwidth/noise requirements, can be properly accommodated; thermal management with high precision control; flexibility of number from 1 to N fibers without change of process; and flexibility to migrate to flip-chip or other electro-optical connections, as it is illustrated in FIG. 16.

FIG. 16 illustrates an exemplary use of a technology of flip-chip for the connection of two chipsets comprised in a bidirectional optical sub assembly based on photonic integrated circuit, wherein the hosting apparatus, by means of the top processed wafer, aligns the optical fiber by its built-in V-groove and it is flipped on a second processed wafer layer. The connection between the two processed wafers layers is provided by ball soldering methods, for instance a Ball Grid Array (BGA) solder.

Moreover, the standards of networks and transceivers are continuously updated and upgraded toward the high-throughput dense integrity and embedding several functionalities within less space. Moreover, there is a possibility that some new findings and/or physical laws also ask for different chipset's orientations or different optical fiber's orientations. To satisfy all current and future requirements, the invented apparatus is presented not only for hosting different functionalities but also for conferring orientation flexibility to retain multiple chipsets as well as keeping optical fibers aligned. The shape, dimensions and orientation of chipsets depend on their functionalities and applications but must work coherently together through proper contact type.

In the preferred embodiments of the invention, the multifunctional and self-sustained hosting apparatus comprises a temperature sensor (5), which is configured for sensing temperature to be used for thermal management. The temperature sensor (5) is an element which contributes to the thermal management of the bidirectional optical sub assembly based on photonic integrated circuit, which is connectable to external optical fibers according to the present invention, wherein the thermal management is essential in many applications, particularly but not limited to the PIC. A plurality of temperature sensors (5) may be incorporated in the hosting apparatus.

In the preferred embodiments of the present invention, namely in the hosting apparatus and in the bidirectional optical sub assembly based on photonic integrated circuit comprising said hosting apparatus, the temperature sensor (5) is a thermistor, for example a built-in integrated planar thin film thermistor, wherein said thermistor is configured to execute thermal management and temperature controlling for temperature-sensitive chipsets (9). Preferably, the thermistors are built-in feature of said apparatus, and they are responsible for sensing temperature to be used for thermal management. In the preferred embodiments of the invention, a unit of temperature control, incorporating a Thermoelectric Cooler (TEC), is connected to the hosting apparatus, in order to exploit the built-in thermistor to directly receive temperature feedback in a closed-loop system and, consequently performing a central control of the operation of the bidirectional optical sub assembly based on photonic integrated circuit.

In other embodiments, the hosting apparatus and the bidirectional optical sub assembly based on photonic integrated circuit comprising said hosting apparatus comprise a resistor (14) embedded on the processed wafer (1), for instance a built-in integrated thin film resistor, wherein said resistor (14) is configured for insertion of a heat flow in the multi-chip system, warming up particular positions of said the multi-chip system under special circumstances. The hosting apparatus is able to carry a flexible electrical metallization layout from sensors to a variable resistor electrical line, such the DC lines (4) and the temperature sensor (5), which may act as a resistor as well.

As it is illustrated in FIGS. 9 and 10, at least a V-groove (3) is disposed at an acute angle in relation to the longitudinal extension of the optical endface of a chipset (8). The exemplary embodiments of FIGS. 9 and 10 also show a V-groove (3), which is formed in a submount (10), wherein the submount (10) is attached to a recess in the processed wafer (1).

A low-loss edge coupling for connecting an optical endface of a chipset (8) and an end part of the in/out optical fiber (7) or an optical lens (15) is featured by tolerances according to a cartesian coordinate system. Therefore, there is less than 10 μm tolerances in the Y and Z axis and about 50 μm on the X axis for directions for a 3 dB (half power) loss. As the application provides submicron alignment tolerances, the present invention is within less than 3 dB (half power) edge coupling losses which is considered as low-loss edge coupling.

In the preferred embodiments of the bidirectional optical sub assembly based on photonic integrated circuit according to the present invention, the connection between the in/out optical fiber (7) or the optical lens (15) and the optical endface of a chipset (8) is executed by means of an edge coupling.

Regarding the optical contact of a positioned optical fiber on a V-groove (3) and an optical endface of a chipset (8), the well-arranged V-grooves (3) provide optical alignment of optical fiber(s) with the optical endface of a chipset (8) by considering the refractive index referred to an involved material and underlying governing physical law, namely the Snell law, wherein said alignment between an optical fiber and an optical endface of a chipset (8) may be carried out with submicron tolerance. The generated optical signals will then be transferred and received via well-aligned optical fibers.

V-grooves (3) are designed based on the size and position of a chipset (9), and whether it is required an optical connection to an optical fiber or not. V grooves (3) align an optical fiber without consuming energy and without any controlling system by means of an optical alignment.

In the preferred embodiments of the bidirectional optical sub assembly based on photonic integrated circuit according to the present invention, the connection between the core of an in/out optical fiber (7) and the V-groove (3) is performed by means of an adhesive, such as an epoxy or other suitable material, as it is illustrated in FIGS. 6 and 7. Therefore, the employed adhesive guarantees optical fibers to be secured, fixed and stable at their positions on the V-grooves (3).

In the preferred embodiments of the bidirectional optical sub assembly based on photonic integrated circuit according to the present invention, the connection between the chipset (9) and the cavity (2) is performed by means of an adhesive, such as an epoxy or other suitable material, as it is illustrated in FIG. 8, wherein the connection may be accomplished under submicron precision.

As illustrated in FIGS. 13, 14 and 16, at least a chipset (9) is connected by at least an electrical connection to a direct current line (4) or a radio frequency line (13), wherein said electrical connection is selected from the group consisting of a wire bonding (11) and a solder bump (12), wherein solder bumps (12) may be used for interconnecting the chipsets (9) comprised in the bidirectional optical sub assembly based on photonic integrated circuit according to the present invention with other devices such as semiconductor devices, integrated circuits chips, integrated passive devices, microelectromechanical systems (MEMS), and external circuits by means of the flip chip technology, also known as controlled collapse chip connection.

Moreover, the RF lines (13) or the DC Lines (4) provide internal connectivity and also external connectivity with external devices, for instance an external driver, a printed circuit board and a Thermoelectric Cooler (TEC). As an example of external connectivity, the RF lines (13) route the RF signals from an external driver to the active chipsets comprised in the bidirectional optical sub assembly based on photonic integrated circuit. Therefore, the hosting apparatus has electrical tracks designed for routing electrical signals in the frequency domain from 0 Hz (DC signal) to Radio Frequency up to 300 GHz (RF signal) from an external driver/source to the chipset active components and vice-versa. The RF lines (13) are used for RF signal transmission, as seen in FIGS. 9 and 15.

Regarding the electrical connectivity, the RF lines (13) or the DC Lines (4) also may be used to electrically connect different conductive layers and ground planes by means of Through Silicon Vias—TSV (16), as it is illustrated in FIG. 17, which represents the TSV (16) at a cross-sectional view, wherein a conductor material (17) is placed at both ends of said TSV (16).

As used in this description, the expressions "about" and "approximately" refer to a range in values of roughly 10% the specified number.

As used in this description, the expression "substantially" means that the real value is within an interval of about 10% of the desired value, variable or related limit, particularly within about 5% of the desired value, variable or related limit or particularly within about 1% of the desired value, variable or related limit.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the term "exemplary" is intended to mean serving as an illustration or example of something and is not intended to indicate a preference.

The subject matter described above is provided as an illustration of the present invention and must not be interpreted to limit it. The terminology used with the purpose of describing specific embodiments, according to the present invention, must not be interpreted to limit the invention. As used in this description, the definite and indefinite articles, in their singular form, aim to include in the interpretation the plural forms, unless the context of the description explicitly indicates the contrary. It will be understood that the expressions "comprise" and "include", when used in this description, specify the presence of the characteristics, the elements, the components, the steps and the related operations, but do not exclude the possibility of other characteristics, elements, components, steps and operations from being also contemplated.

All modifications, providing that they do not modify the essential features of the following claims, must be considered within the scope of protection of the present invention.

INDUSTRIAL APPLICABILITY

The multifunctional self-sustained hosting apparatus and the bidirectional optical sub assembly based on photonic integrated circuit comprising said apparatus, according to the present invention, may be employed in at least one application selected from the group consisting of photonic integrated circuits and integrated circuits co-packaging, hosting of arbitrary-oriented multiple chipsets and optically aligning of arbitrary-oriented multiple optical fibers.

Considering the energy constraints and limitations, photonic integrated circuits, namely photonic microchips, have high energy efficiency leading to devices which may work for a longer time and including notable power saving option, besides being faster. Photonics find its application, for example, in telecommunications, healthcare diagnostics, data-processing industry, mobility, safety and security, and agro-food. The present invention is an assurance that photonics will surely bring important transformations in this new domain. All in all, the potential of an integrated photonics market is capable of generating a huge revenue.

The invention in the area of photonic integrated circuits (PICs) have also materialized into of the leading platforms for implementing photonic quantum technologies for applications in secure quantum communication, enhanced quantum sensing, and quantum information processing.

REFERENCE SIGNS LIST 1. a processed wafer;
2. a cavity;
3. a V-groove;
4. a direct current line;
5. a temperature sensor;
6. a cladding of an in/out optical fiber;
7. an in/out optical fiber;
8. an optical endface of a chipset;
9. a chipset;
10. a submount;
11. a wire bonding;
12. a solder bump;
13. a radio frequency line;
14. a resistor;
15. an optical lens;
16. a Through Silicon Via;
17. a conductor material.

The invention claimed is:

1. A multifunctional self-sustained hosting apparatus for photonic integrated circuit and/or related chipset system packaging comprising:
   a processed wafer (1); and
   a plurality of cavities (2) embedded on a top surface of the processed wafer (1); and
   at least a V-groove (3), which is formed on the top surface of the processed wafer (1) or in a submount (10); and
   wherein the submount (10) is attached to a recess in the processed wafer (1), and said recess and said submount (10) are arranged at an adjacent position in relation to at least one cavity (2); and
   wherein said V-groove extends from an edge of said processed wafer (1) or said submount (10) toward at least one cavity (2); and
   wherein said V-groove (3) is configured for receiving at least an in/out optical fiber (7) and optically align said in/out optical fiber (7) with an optical endface of a chipset (8);
wherein the multifunctional self-sustained hosting apparatus further comprises a radio frequency line (13) embedded on the processed wafer (1) and, optionally, further comprises a direct-current line (4) embedded on the processed wafer (1), characterized in that each cavity (2) is configured to receive at least one from the group consisting of a chipset (9) and an optical lens (15), and the cavities (2) are disposed in an arbitrary orientation across the processed wafer (1).

2. The multifunctional self-sustained hosting apparatus, according to claim 1, characterized by the cavities (2) are disposed longitudinally across the processed wafer (1), forming at least a row of cavities (2).

3. The multifunctional self-sustained hosting apparatus, according to claim 1, characterized in that a plurality of cavities (2), that are disposed transversely across the processed wafer (1), form at least a column of cavities (2).

4. The multifunctional self-sustained hosting apparatus, according to claim 1, characterized by the cavities (2) are disposed in a row at an acute angle in relation to the extension of the V-groove (3).

5. The multifunctional self-sustained hosting apparatus, according to claim 1, characterized by comprising a temperature sensor (5), which is configured for sensing temperature to be used for thermal management.

6. The multifunctional self-sustained hosting apparatus, according to claim 5, characterized by the temperature sensor (5) is a thermistor.

7. The multifunctional self-sustained hosting apparatus, according to claim 6, characterized by the temperature sensor (5) is a built-in integrated planar thin film thermistor.

8. The multifunctional self-sustained hosting apparatus, according to claim 1, characterized by at least a V-groove (3) is disposed at an acute angle in relation to the longitudinal extension of the optical endface of a chipset (8).

9. The multifunctional self-sustained hosting apparatus, according to claim 1, characterized by comprising a resistor (14) embedded on the processed wafer (1).

10. The multifunctional self-sustained hosting apparatus, according to claim 9, characterized by the resistor (14) embedded on the processed wafer (1) is a built-in integrated thin film resistor.

11. A bidirectional optical sub assembly based on photonic integrated circuit comprising a multifunctional self-sustained hosting apparatus for photonic integrated circuit and/or related chipset system packaging, wherein said hosting apparatus is configured to unify and integrate at least one photonic integrated circuit and one chipset (9) within a miniaturized single entity, and comprises:
   a processed wafer (1); and
   a plurality of cavities (2) embedded on a top surface of the processed wafer (1); and
   at least a V-groove (3), which is formed on the top surface of the processed wafer (1) or in a submount (10); and
   wherein the submount (10) is attached to a recess in the processed wafer (1), and said recess and said submount (10) are arranged at an adjacent position in relation to at least one cavity (2); and
   wherein said V-groove extends from an edge of said processed wafer (1) or said submount (10) toward at least one cavity (2); and
   wherein said V-groove (3) is configured for receiving at least an in/out optical fiber (7) and optically align said in/out optical fiber (7) with an optical endface of a chipset (8); and characterized in that each cavity (2) is configured to receive at least one from the group consisting of a chipset (9) and an optical lens (15), and the cavities (2) are disposed in an arbitrary orientation across the processed wafer (1); and
   the bidirectional optical sub assembly based on photonic integrated circuit further comprises at least an in/out optical fiber (7) connected to the V-groove (3) of said hosting apparatus; and
   the bidirectional optical sub assembly based on photonic integrated circuit further comprises the optical endface of a chipset (8) optically connected to an end part of the in/out optical fiber (7) or the optical lens (15) by means of an edge coupling; wherein
   the hosting apparatus comprises a radio frequency line (13) embedded on the processed wafer (1) and, optionally, further comprises a direct-current line (4) embedded on the processed wafer (1); and wherein
   at least a chipset (9) is connected by at least an electrical connection to the radio frequency line (13).

12. The bidirectional optical sub assembly based on photonic integrated circuit, according to claim 11, characterized by the cavities (2) are disposed longitudinally across the processed wafer (1) in the hosting apparatus, forming at least a row of cavities (2).

13. The bidirectional optical sub assembly based on photonic integrated circuit, according to claim 12, characterized in that a plurality of cavities (2), that are disposed transversely across the processed wafer (1) in the hosting apparatus, form at least a column of cavities (2).

14. The bidirectional optical sub assembly based on photonic integrated circuit, according to claim 12, characterized by the cavities (2) are disposed in a row at an acute angle in relation to the extension of the V-groove (3).

15. The bidirectional optical sub assembly based on photonic integrated circuit, according to claim 11, characterized by the hosting apparatus comprises a temperature sensor (5), which is configured for sensing temperature of the bidirectional optical sub assembly based on photonic integrated circuit to be used for thermal management.

16. The bidirectional optical sub assembly based on photonic integrated circuit, according to claim 15, characterized by the temperature sensor (5) is a thermistor, wherein the thermistor is a built-in integrated planar thin film thermistor, wherein said thermistor is configured to execute thermal management and temperature controlling for a temperature-sensitive chipset (9).

17. The bidirectional optical sub assembly based on photonic integrated circuit, according to claim 11, characterized by comprising a resistor (14) embedded on the processed wafer (1), wherein said resistor (14) is configured for insertion of a heat flow in the bidirectional optical sub assembly based on photonic integrated circuit.

18. The bidirectional optical sub assembly based on photonic integrated circuit, according to claim 17, characterized by the resistor (14) is a built-in integrated thin film resistor.

19. The bidirectional optical sub assembly based on photonic integrated circuit, according to claim 11, characterized by at least a V-groove (3) is disposed at an acute angle in relation to the longitudinal extension of the optical endface of a chipset (8).

20. The bidirectional optical sub assembly based on photonic integrated circuit, according to claim 11, characterized by the connection between the in/out optical fiber (7) and the V-groove (3) is performed by means of an adhesive.

21. The bidirectional optical sub assembly based on photonic integrated circuit, according to claim 11 characterized by the connection between the chipset (9) and the cavity (2) is performed by means of an adhesive.

22. The bidirectional optical sub assembly based on photonic integrated circuit, according to claim 11, characterized by the chipset (9) is connected by at least an electrical connection to and the direct current line (4) or the radio frequency line (13), wherein said electrical connection is selected from the group consisting of a wire bonding (11) and a solder bump (12).

23. The bidirectional optical sub assembly based on photonic integrated circuit, according to claim 11, characterized by an optical lens (15) optically aligns at least one from the group consisting of a pair of optical endface of chipsets (8), which are disposed respectively on adjacent chipsets (9), and a pair of an optical endface of a chipset (8) and an in/out optical fiber (7).

\* \* \* \* \*